United States Patent [19]

Meyer et al.

[11] 4,307,227
[45] Dec. 22, 1981

[54] ESTER-MODIFIED POLYAMIDES

[75] Inventors: Rolf-Volker Meyer, Krefeld; Gerhard Hohmann, Leverkusen; Hans Rudolph; Rolf Dhein, both of Krefeld; Manfred Dollhausen, Odenthal, all of Fed. Rep. of Germany

[73] Assignee: Bayer Aktiengesellschaft, Fed. Rep. of Germany

[21] Appl. No.: 135,884

[22] Filed: Mar. 31, 1980

[30] Foreign Application Priority Data

Apr. 4, 1979 [DE]  Fed. Rep. of Germany ....... 2913460

[51] Int. Cl.³ .................... C08G 63/12; C08G 63/66
[52] U.S. Cl. ............................. 528/288; 428/474.4; 428/480; 528/301; 528/324
[58] Field of Search ................................ 528/288, 324

[56] References Cited

U.S. PATENT DOCUMENTS 2,450,940 10/1948 Cowan et al. .................... 260/404.5
2,886,543  5/1959 Peerman et al. ................. 260/18 N
3,546,178 12/1970 Caldwell et al. .................... 528/288

Primary Examiner—Harold D. Anderson
Attorney, Agent, or Firm—Connolly and Hutz

[57] ABSTRACT

Ester-modified polyamides containing of from 50 to 80% by weight of —HN—$(CH_2)_5$—CO units are obtained by reaction of γ-caprolactam and mixtures of dicarboxylic acids, primary diamines and polyalkylene glycols and are suitable inter alia as hot melt adhesives and for the elastification of thermoplastic materials.

7 Claims, No Drawings

ESTER-MODIFIED POLYAMIDES

This invention relates to ester-modified polyamides and to their use as hot melt adhesives.

Cementing is usually attained using solvent-containing adhesives or so-called polymerisation adhesives. In both cases, a certain period is required for the solvent to evaporate or for polymerisation before the bond has reached its full strength.

Modern time-saving operating techniques demand a minimum setting time for adhesion, which can be achieved in many cases by the use of hot melt adhesives.

Suitable hot melt adhesives include, for example, thermoplastic materials of various types such as high pressure polyethylene, low pressure polyethylene, polyesters and also copolyamides which are selected according to the desired field of application and are applied in the form of powders, pastes or melts to the articles and materials to be cemented.

Powdered hot melt adhesives which produce bonds by hot pressing or by a steam-pressing process are preferably applied for bonding textiles.

In the shoe industry, in particular for toe and heel lasting, the hot melt adhesives used for this purpose are applied as melts which are subjected to a brief pressure loading as they cool and which have to produce a permanent bond immediately.

Hot melt adhesive raw materials based on thermoplastic polyesters and polyamide resins are preferably used for this field of application.

The polyester-based products which are suitable in principle generally have the disadvantage that they have to be processed at temperatures above 200° C. and, in addition, produce a bond which is only slightly elastic and which can easily break under a bending stress.

Polyamide resins based on polymeric fatty acids and diamines are known, for example, from U.S. Pat. No. 2,886,543. However, the polyamides described therein, which are composed of polymeric fatty acids and mixtures of alkylene diamines and polyalkylene polyamines are not sufficiently cohesive and, moreover, are tacky on the surface at room temperature.

U.S. Pat. No. 2,450,940 describes polyamide resins produced from mixtures of polymeric fatty acids and other polybasic acids as well as 1,2-diaminoethane. Although these resins have a high tensile strength, they have virtually no elongation and, without other elasticizing additives, are practically unusable as raw materials for adhesives.

A general disadvantage of these polyamide resins is the unsatisfactory degree of purity of the commercial dimeric fatty acids which contain large proportions of monomeric and trimeric fatty acids owing to the production process.

By using polymeric fatty acids having a dimeric fatty acids content above 90%, preferably above 95%, products having sufficient elasticity and bonding strength can be produced, provided the monomeric and trimeric fatty acid impurities are guaranteed to be present only in limited proportions (German Offenlegungsschrift No. 1,520,933, German Auslegeschrift No. 1,594,008).

Thus, an excessive trimeric fatty acids content can easily cause the viscosity of the melt to be too high or can even cause it to gel, whereas an excessive monomeric fatty acid content leads to products which are brittle and unflexible.

An additional disadvantage of these polyamide resins is the fact that they tend to increase in viscosity and to darken in contact with air at the necessary processing temperatures of up to 200° C. (Coating 8, 218, 1971).

The above-mentioned disadvantages similarly apply to the polyester amides described in German Offenlegungsschrift No. 1,520,002, which are obtained by using alkanolamines.

German Offenlegungsschrift No. 2,542,467 describes polyester amides composed of lactams, primary diamines, polyhydric alcohols containing from 2 to 12 carbon atoms and dicarboxylic acids which can be used as hot melt adhesives. However, these polyester amides usually have softening points which are too high for processing from the melt and/or are not sufficiently elastic.

Products produced from lauryl lactam as the main component with concurrent use of dodecane dicarboxylic acid or dodecane diol generally meet higher requirements with respect to elasticity and processibility. In addition to the difficulties in obtaining these starting products, the two-stage process for producing these polyester amides is particularly disadvantageous, pressure having to be applied in the first stage while a vacuum has to be applied in the second stage.

Polyester amides produced from caprolactam, $C_6$–$C_{12}$-dicarboxylic acids and certain polyether alcohols are known as migration-stable plasticizers for polyamides from German Democratic Republic Patent No. 87 888. These paste-form products are unsuitable as hot melt adhesives, however, as they are not pourable, the bonding time is much too long and the elasticity as well as the adhesiveness is unsatisfactory.

It has now surprisingly been found that ester-modified polyamides composed of caprolactam, $C_6$–$C_{10}$-dicarboxylic acids, primary $C_6$–$C_{25}$-diamines and polyalkylene glycols are high quality fusible adhesives which do not exhibit the above-mentioned disadvantages.

The present invention provides ester-modified polyamides containing of from 50 to 80% by weight of —H—N—$(CH_2)_5$—CO units, obtained by the reaction of (I) from 50 to 80% by weight of ε-caprolactam, and
(II) from 20 to 50% by weight of a mixture of
  (a) $C_6$–$C_{10}$-dicarboxylic acids,
  (b) primary aliphatic and/or cycloaliphatic $C_6$–$C_{25}$-diamines, and
  (c) polyalkylene glycols having a molecular weight of from 200 to 1,000, wherein the sum of I and II is 100% by weight and, based on the component a, 0.5 to 0.9 equivalents of component b and 0.1 to 0.5 equivalents of component c are used and the sum of components b and c=0.95 to 1.05 equivalents.

Suitable dicarboxylic acid components include aliphatic and aromatic $C_6$–$C_{10}$-dicarboxylic acids such as adipic acid, azelaic acid, isophthalic acid and terephthalic acid or mixtures thereof. Isophthalic acid, which may contain up to 10% by weight of terephthalic acid, or adipic acid is preferably used.

Suitable polyalkylene glycols include, for example, polyethylene glycols and polypropylene glycols as well as polyalkylene glycols obtained from ethylene oxide and propylene oxide having molecular weight of from 200 to 1,000 preferably from 200 to 600.

Suitable diamine components include primary aliphatic and cycloaliphatic $C_6$–$C_{25}$-diamines such as hexamethylenediamine, trimethylhexamethylenediamines, isophorone diamine and binuclear diamines corresponding to the formula (1):

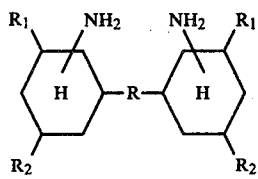

in which R is an alkylene or alkylidene radical containing from 1 to 4 carbon atoms and preferably

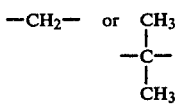

$R_1$ and $R_2$ are the same or different and represent H or $C_1$-$C_3$-alkyl and preferably H or $CH_3$.

Examples of such binuclear diamines include 4,4'-diamino-3,3'-dimethyl-dicyclohexylmethane, 4,4'-diamino-3,3',5,5'-tetramethyl-dicyclohexylmethane, 4,4'-diamino-dicyclohexylpropane and preferably 4,4'-diamino-dicyclohexylmethane and diaminodicyclohexylmethane isomer mixtures consisting of at least 75% of the 4,4'-isomer. Mixtures of the said diamines are obviously also suitable.

It is particularly preferred to use hexamethylene diamine and/or hydration products of commercial diamino diphenyl methane mixtures which, owing to their method of production, may contain up to 10 mole percent of trinuclear triamines corresponding to the formula (2):

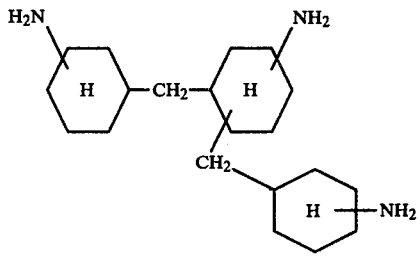

Particularly preferred are polyester amides according to the present invention composed of
(I) from 55 to 70% by weight of ε-caprolactam, and
(II) from 30 to 45% by weight of a mixture of
  (a) isophthalic acid and/or adipic acid,
  (b) hexamethylenediamine and/or hydrated commercial diaminodiphenylmethane mixtures which contain at least 75% of 4,4'-diaminodicyclohexylmethanes and can contain up to 10 mole % of trinuclear triamines corresponding to formula (2), and
  (c) polyethylene glycols having a molecular weight of from 200 to 600.

Particularly preferred are polyester amides composed of
(I) from 60 to 70% by weight of ε-caprolactam, and
(II) from 30 to 40% by weight of a mixture of
  (a) 1 equivalent of isophthalic acid,
  (b) from 0.5 to 0.9 equivalents of a diaminodicyclohexylmethane mixture containing at least 75% of the 4,4'-isomers, and
  (c) from 0.1 to 0.5 equivalents of polyethylene glycol having a molecular weight of from 200 to 400, wherein the sum of (b) and (c) is 1 equivalent.

Optimum pourability of the polyester amides can be achieved by using up to 10 mole % of the trinuclear triamines corresponding to formula (2). Suitable trifunctional alcohols such as trimethylolpropane and glycerine can also be used for this purpose during polycondensation.

The products according to the invention have acid numbers of from 5 to 20, preferably from 8 to 15, and relative viscosities (1% by weight solution in m-cresol at 25° C.) of from 1.4 to 2.2, preferably from 1.6 to 2.0. Their softening range lies between 100° and 180° C., preferably between 120° and 160° C., and their melt viscosity is from 0.5 to 100 Pa.s, preferably from 1 to 50 Pa.s at 200° C.

If the polyester amides contain a higher proportion of incorporated —$CO(CH_2)_5NH$— groups than that according to the invention, the melt viscosity begins to increase to an undesirable extent, and, with a lower proportion, the products are tacky on the surface even at temperatures below 100° C.

Without the polyglycol component, high viscosity and high melting products which are also unsuitable for use as a raw material for a hot melt adhesive are obtained. Without the diamine component, soft, tacky products which are not flowable and do not have any bonding strength owing to their failure to solidify are obtained, as described in German Democratic Republic Patent No. 87 888.

The polyester amides according to the invention can be produced in a conventional manner in autoclaves by condensation of the starting components. The monomer mixture is gradually heated to between 200° to 300° C., preferably to between 220° and 250° C., and is subjected to polycondensation in this temperature range under a nitrogen atmosphere until the desired molecular weight is achieved. The progress of the reaction can easily be followed by determining the acid number. Upon completion of polycondensation, the polymer melt is cooled to between 120° and 200° C., depending on the composition of the product, extruded from the autoclave as a strip or a strand by applying a nitrogen pressure and comminuted in a suitable manner, for example minced, cut or granulated.

The pourable product obtained can be freed from unreacted caprolactam by extraction with water without impairing the desirable elasticity of the polyester amides. The products which can be obtained by extraction of the monomeric caprolactam are also distinguished by their higher stability of viscosity and their bonding time which is further reduced.

The products according to the invention can contain conventional additives such as, for example, pigments, delustring agents or stabilizers. These additives can be incorporated before, during or after polycondensation.

The ester modified polyamides according to the invention can be used to elasticize other thermoplastic materials, but are particularly suitable as high quality raw materials for hot melt adhesives, preferably in the shoe industry.

The invention is described in more detail below by means of examples. The parts and percentages given are in all cases by weight.

EXAMPLE 1

7.8 kg of ε-caprolactam, 2.21 kg (13.3 mol) of isophthalic acid, 1.37 kg (3.43 mol) of polyethylene glycol (molecular weight 400) and 1.16 kg (10.0 mol) of hexamethylenediamine are heated to 200° C. in a closed autoclave under an $N_2$-atmosphere and are precondensed for 2 hours at 200° C. After carefully releasing the pressure, the mixture is heated to 250° C. and further condensed for a further 5 hours (acid number of the product: 14 mg KOH/g, measured in dimethylformamide). The product is cooled to about 200° C. and then extruded as a strand on a metal strip and granulated.

The softening range of the slightly yellow-cast product is 115° to 130° C.; the relative viscosity (1% solution in m-cresol, 20° C.) is 1.4.

The technological data of the product are compiled in Table 1.

EXAMPLE 2

A polyester amide obtained according to Example 1 is treated with distilled water at 40° C. for 6 hours, 6.3% by weight of caprolactam being extracted. The polyester amide obtained in this way has a softening range of from 125° to 140° C. The technological data are also compiled in Table 1.

EXAMPLE 3

7.60 kg of ε-caprolactam, 1.53 kg (9.22 mol) of isophthalic acid, 1.83 kg (4.57 mol) of polyethylene glycol (molecular weight 400) and 1.03 kg (4.9 mol) of an amine mixture having the following composition:

| |
|---|
| 95% by weight of isomeric diaminodicyclohexylmethane corresponding to formula (1) |
| (including ca. 95% of 4,4'-isomer |
| ca. 5% of 2,4'-isomer |
| <1% of 2,2'-isomer) |
| 5% by weight of isomeric trinuclear triamines corresponding to formula (2) | are subjected to polycondensation to form a polyester amide as described in Example 1.

The product is spun from the melt and cooled to about 200° C. by passing through a water bath and granulated, then extracted with water as described in Example 2. The almost colourless product has a softening range of from 135° to 140° C. (from 120° to 130° C. before extraction), a relative viscosity of 1.6 and an acid number of 11.0 mgKOH/g. The technological test results are compiled in Table 1.

EXAMPLE 4

950 g of ε-caprolactam, 192 g (1.15 mol) of isophthalic acid, 36 g (0.31 mol) of hexamethylenediamine, 65 g (0.31 mol) of the amine mixture described in Example 3 and 230 g (0.575 mol) of polyethylene glycol (molecular weight 400 ) are heated to 200° C. under a $N_2$-atmosphere in a 4 liter glass apparatus, precondensed for 2 hours at 200° C. and, after the heating treatment, are condensed for 6 hours to completion at 250° C. The light yellow product is poured over a metal sheet, cooled and minced into a granulate, and extracted with water as described in Example 2. The product has a relative viscosity of 1.7, an acid number of 9 mg KOH/g and a softening range of 145° to 155° C. The technological data are compiled in Table 1.

EXAMPLE 5

As described in Example 4, a polyester amide is produced from

- 900 g of ε-caprolactam
- 240 g (1.64 mol) of adipic acid
- 116 g (1.0 mol) of hexamethylenediamine
- 280 g (0.7 mol) of polyethylene glycol (molecular weight 400).

The almost colourless product has an acid number of 9.5 mg KOH/g, a relative viscosity of 1.5 and a softening range of from 155° to 165° C.

The technological data of the product are compiled in Table 1.

EXAMPLE 6

As described in Example 4, a polyester amide is produced from

- 800 g of ε-caprolactam
- 202 g (1.22 mol) of isophthalic acid
- 135 g (0.64 mol) of amine mixture from Example 3 and
- 120 g (0.6 mol) of polyethylene glycol (molecular weigh t200).

The light yellow transparent product has a reaction time of 13 hours at 250° C., an acid number of 12 mg KOH/g, a relative viscosity of 1.6 and a softening range of 110° to 120° C.

The technological data are compiled in Table 1.

Note on Table 1

The setting time was measured in the following manner:

1 drop of the melt heated to 200° C. is charged onto one end of a 100×20×3 mm large test sample consisting of a conventional commercial vulcanised natural rubber having a Shore hardness of 92 which has been roughened in the longitudinal direction with an abrasive belt having a granulation of 40.

Immediately afterwards, the other end of the test sample is pressed manually onto the side coated with polymer melt.

By producing several bonds using varying pressing times, the time after which the bond resists the inherent tension of the test sample and no longer loosens is determined in seconds.

TABLE 1

Technological properties of the hot melt adhesive raw materials described in Examples 1 to 6.

| Product from Example | Viscosity[x] at 200° C. (Pas) | Setting time (sec) | Tensile strength according to DIN 53504 (MPa) |
|---|---|---|---|
| 1 | 4 | 4 | 12.9 |
| 2 | 15 | 3 | 16.7 |
| 3 | 42 | 2 | 15.4 |
| 4 | 26 | 2 | 11.3 |
| 5 | 18 | 3 | 8.9 |
| 6 | 5 | 2 | 13.5 |

[x]Measured using an RVT Brookfield Viscosimeter, Spindle 7, 10 rpm.

We claim:

1. A fusible ester-modified polyamide containing at least 50% by weight of —HN—$(CH_2)_5$—CO— units, said polyamide being derived from (I) 50 to 80% by weight of ε-caprolactam, and (II) 20 to 50% by weight of a mixture of
  (a) one equivalent of at least one $C_6$–$C_{10}$ dicarboxylic acid
  (b) from 0.5 to 0.9 equivalents of at least one member selected from the group consisting of primary aliphatic and cycloaliphatic $C_6$–$C_{25}$ diamines and
  (c) from 0.1 to 0.5 equivalents of at least one polyalkylene glycol having a molecular weight of from 200 to 1,000, the sum of (I) and (II) being 100% by weight and the sum of (b) and (c) being from 0.95 to 1.05 equivalents.

2. A fusible ester-modified polyamide according to claim 1 composed of
  (I) from 55 to 70% by weight of ε-caprolactam and
  (II) from 30 to 45% by weight of a mixture of components (a) to (c).

3. A fusible ester-modified polyamide according to claim 1 wherein at least one member of the group consisting of isophathalic acid and adipic acid is used as component (a).

4. A fusible ester-modified polyamide according to claim 1 wherein component (b) is at least one member selected from the group consisting of hexamethylenediamine and hydrated commercial diaminodiphenylmethane mixture which contains at least 75% by weight of 4-4'-diaminodicyclohexylmethane and 0 to 10 mole percent of trinuclear triamine of the formula

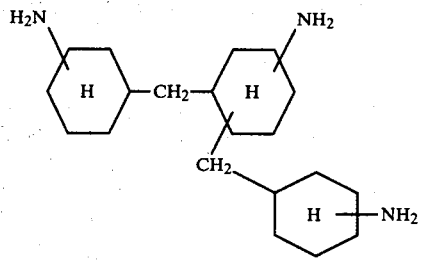

5. A fusible ester-modified polyamide according to claim 1 wherein (c) is polyethylene glycol having a molecular weight of from 200 to 600.

6. A fusible ester-modified polyamide according to claim 1 derived from
  (I) 60 to 70% by weight of ε-caprolactam and (II) 30 to 40% by weight of a mixture of
    (a) one equivalent of isophthalic acid
    (b) from 0.5 to 0.9 equivalents of hydrated commercial diaminodiphenylmethane mixture containing at least 75% by weight of 4-4'-diaminodicyclohexylmethane and 0 to 10 mole percent of a trinuclear triamine of the formula

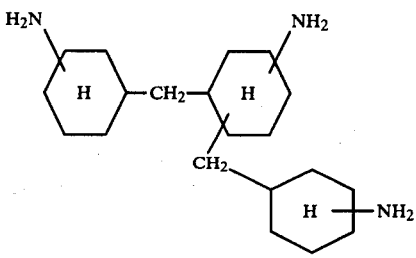

and (c) from 0.1 to 0.5 equivalents of polyethylene glycol having a molecular weight of from 200 to 400, the sum of (b) and (c) being one equivalent and the sum of (I) and (II) being 100% by weight.

7. A hot melt adhesive comprising an ester-modified polyamide as claimed in claim 1.

* * * * *